US012609066B2

(12) United States Patent
Hsieh et al.

(10) Patent No.: US 12,609,066 B2
(45) Date of Patent: Apr. 21, 2026

(54) LIGHT EMISSION CONTROL METHOD AND DISPLAY DEVICE HAVING DIFFERENT DISPLAY ORDERS CAPABLE OF REDUCING ARTIFACTS

(71) Applicant: Macroblock, Inc., Hsinchu (TW)

(72) Inventors: Chi-Min Hsieh, Hsinchu (TW); Ming-Jia Wu, Hsinchu (TW); Wei-Hsiang Cheng, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 0 days.

(21) Appl. No.: 19/012,303

(22) Filed: Jan. 7, 2025

(65) Prior Publication Data

US 2025/0239200 A1 Jul. 24, 2025

(30) Foreign Application Priority Data

Jan. 18, 2024 (TW) ................................ 113102105

(51) Int. Cl.
*G09G 3/20* (2006.01)

(52) U.S. Cl.
CPC ... *G09G 3/2007* (2013.01); *G09G 2320/0247* (2013.01); *G09G 2320/0266* (2013.01)

(58) Field of Classification Search
CPC .................................................... G09G 3/2007
USPC .......................................................... 345/690
See application file for complete search history.

(56) References Cited

U.S. PATENT DOCUMENTS

2018/0174502 A1* 6/2018 Matsumoto .......... G09G 3/3216
2023/0097462 A1* 3/2023 Momose .............. G09G 3/2007 345/204
2023/0196987 A1* 6/2023 Hsieh ....................... G09G 3/32 345/82

* cited by examiner

*Primary Examiner* — Long D Pham
(74) *Attorney, Agent, or Firm* — Akerman LLP; Peter A. Chiabotti

(57) ABSTRACT

A light emission control method includes: (A) generating multiple sub-frames based on an image frame that corresponds to a display time period including multiple display time intervals; (B) determining a display order of the sub-frames in the display time intervals, where the display order indicates, with respect to each of multiple display sets of a display, a one-to-one corresponding relationship between the sub-frames and the display time intervals, the one-to-one corresponding relationships with respect to the display sets are different from each other, and in the one-to-one corresponding relationships with respect to at least two of the display sets, a first one of the sub-frames corresponds to different ones of the display time intervals; and (C) in each of the display time intervals, controlling each of the display sets to display one of the sub-frames that corresponds to the display time interval based on the display order.

13 Claims, 9 Drawing Sheets

| display set | display time interval | T1 | T2 | T3 | T4 | T5 | T6 | T7 | T8 |
|---|---|---|---|---|---|---|---|---|---|
| SC1 | display order | 1 | 5 | 3 | 7 | 2 | 6 | 4 | 8 |
| SC2 | | 8 | 1 | 5 | 3 | 7 | 2 | 6 | 4 |
| SC3 | | 4 | 8 | 1 | 5 | 3 | 7 | 2 | 6 |
| SC4 | | 6 | 4 | 8 | 1 | 5 | 3 | 7 | 2 |

LIGHT EMISSION CONTROL METHOD AND DISPLAY DEVICE HAVING DIFFERENT DISPLAY ORDERS CAPABLE OF REDUCING ARTIFACTS

CROSS-REFERENCE TO RELATED APPLICATION

This application claims priority to Taiwanese Invention patent application No. 113102105, filed on Jan. 18, 2024, the entire disclosure of which is incorporated by reference herein.

FIELD

The disclosure relates to display techniques, and more particularly to a light emission control method and a display device capable of reducing artifacts.

BACKGROUND

Referring to FIG. 1, when a screen of a display is dark during an exposure time of an image capture device, an artifact 10 may appear in an image of the screen captured by the image capture device. In addition, the exposure time of the image capture device may be asynchronous with a display time period of the display. Therefore, even if the display continuously shows the same image frame, the artifacts 10 appearing in the images captured by the image capture device would not be located at the same position, resulting in flickering.

SUMMARY

Therefore, an object of the disclosure is to provide a light emission control method and a display device that can reduce artifacts.

According to an aspect of the disclosure, the light emission control method is to be implemented by a driver circuit, and is for controlling a display. The display includes a plurality of light emitting elements that are divided into a plurality of display sets. The light emission control method includes steps of: (A) generating a number (M) of sub-frames based on an image frame, where M is an integer no less than two, the image frame corresponds to a display time period and contains frame gray values of the plurality of light emitting elements, the display time period includes a number (M) of display time intervals, each of the number (M) of sub-frames contains partial gray values of the plurality of light emitting elements, and with respect to each of the plurality of light emitting elements, the frame gray value of the light emitting element is equal to a sum of the partial gray values of the light emitting element that are respectively contained in the number (M) of sub-frames, and the partial gray value of the light emitting element that is contained in an $(m-1)^{th}$ one of the number (M) of sub-frames is no less than the partial gray value of the light emitting element that is contained in an $m^{th}$ one of the number (M) of sub-frames, in which $2 \leq m \leq M$; (B) determining a display order of the number (M) of sub-frames in the number (M) of display time intervals, where the display order indicates, with respect to each of the plurality of display sets, a one-to-one corresponding relationship between the number (M) of sub-frames and the number (M) of display time intervals, the one-to-one corresponding relationships indicated by the display order with respect to the plurality of display sets are different from each other, and in the one-to-one corresponding relationships indicated by the display order with respect to at least two of the plurality of display sets, a first one of the number (M) of sub-frames corresponds to different ones of the number (M) of display time intervals; and (C) in each of the number (M) of display time intervals, controlling each of the plurality of display sets to display one of the number (M) of sub-frames that corresponds to the display time interval according to the one-to-one corresponding relationship indicated by the display order with respect to the display set.

According to another aspect of the disclosure, the display device includes a display and a driver circuit. The display includes a plurality of light emitting elements that are divided into a plurality of display sets. The driver circuit is connected to the display, and is configured to receive an image frame, where the image frame corresponds to a display time period and contains frame gray values of the plurality of light emitting elements, and the display time period includes a number (M) of display time intervals, in which M is an integer no less than two. The driver circuit is further configured to generate a number (M) of sub-frames based on the image frame, where each of the number (M) of sub-frames contains partial gray values of the plurality of light emitting elements, and with respect to each of the plurality of light emitting elements, the frame gray value of the light emitting element is equal to a sum of the partial gray values of the light emitting element that are respectively contained in the number (M) of sub-frames, and the partial gray value of the light emitting element that is contained in an $(m-1)^{th}$ one of the number (M) of sub-frames is no less than the partial gray value of the light emitting element that is contained in an $m^{th}$ one of the number (M) of sub-frames, in which $2 \leq m \leq M$. The driver circuit is further configured to, in each of the number (M) of display time intervals, control each of the plurality of display sets to display one of the number (M) of sub-frames that corresponds to the display time interval, where, with respect to each of the plurality of display sets, the number (M) of sub-frames corresponds to the number (M) of display time intervals in a one-to-one corresponding relationship, the one-to-one corresponding relationships with respect to the plurality of display sets are different from each other, and in the one-to-one corresponding relationships with respect to at least two of the plurality of display sets, a first one of the number (M) of sub-frames corresponds to different ones of the number (M) of display time intervals.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
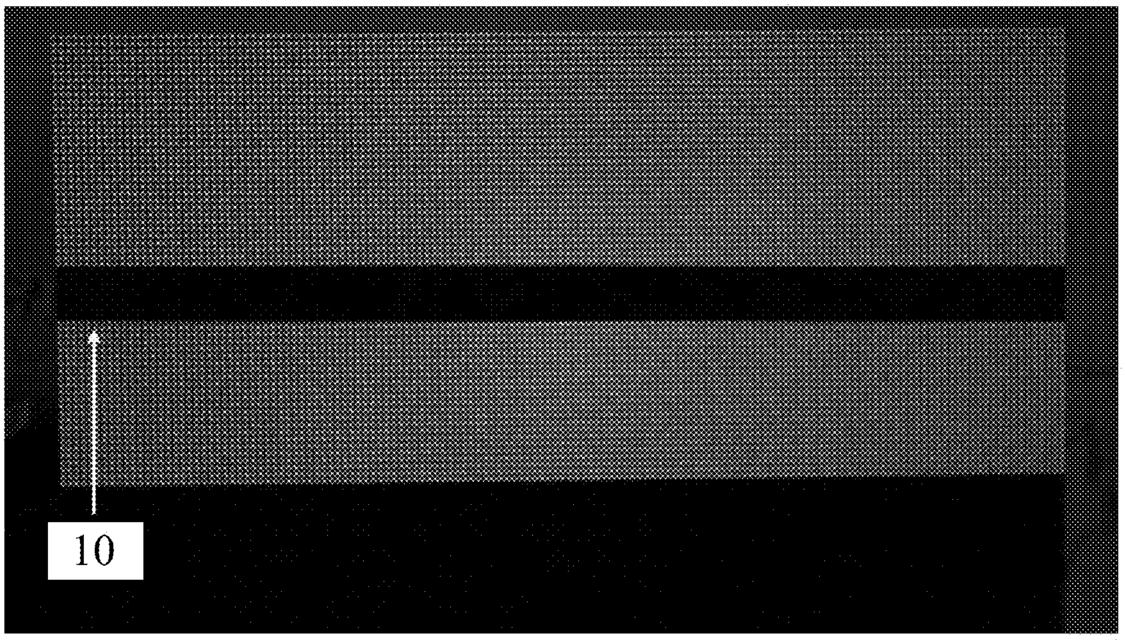
FIG. 1 PRIOR ART
FIG. 1 is a schematic diagram illustrating an image that has an artifact.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
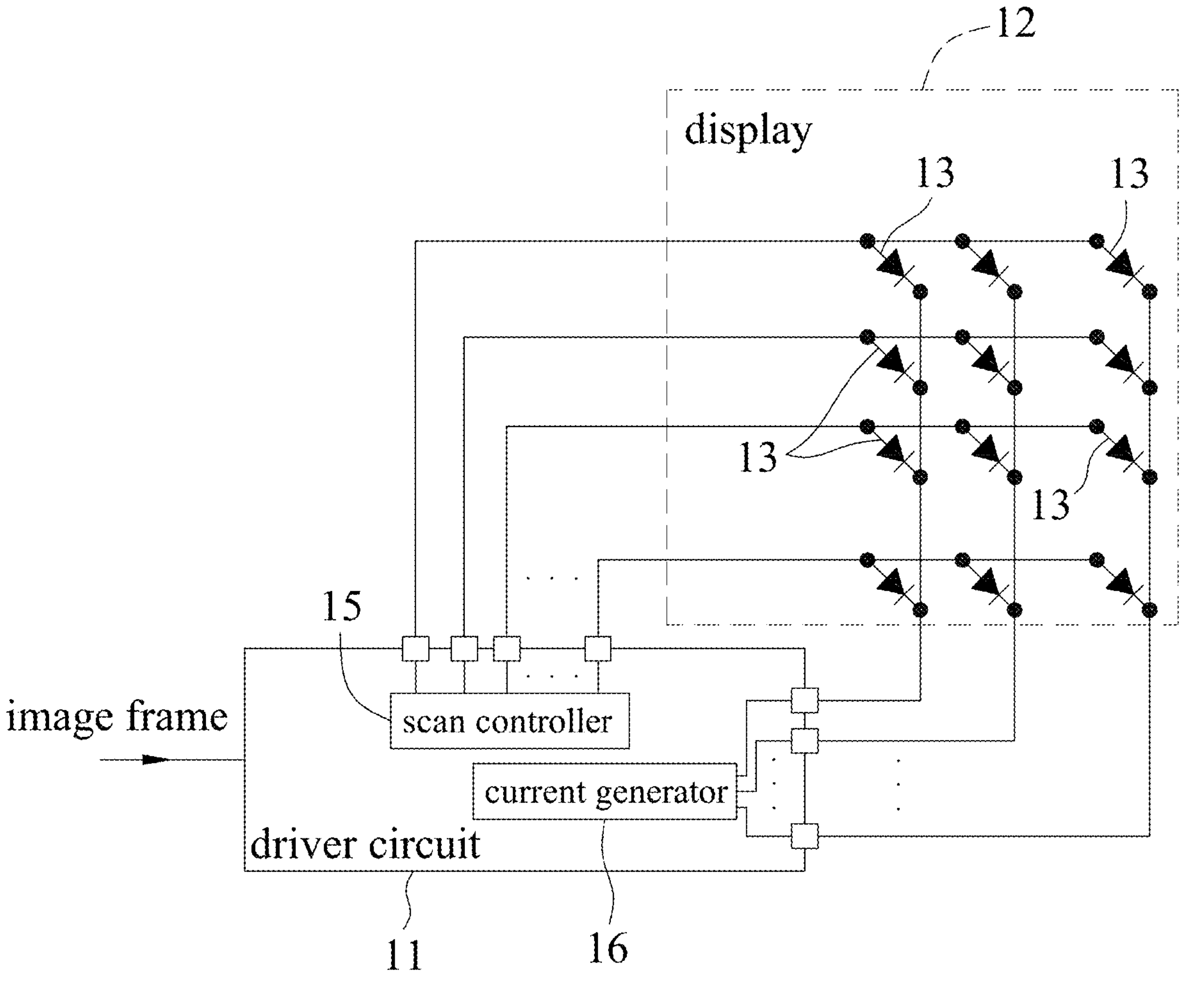
FIG. 2 is a circuit block diagram illustrating a first implementation of an embodiment of a display device according to the disclosure that has a sink type configuration.
Figure 3:
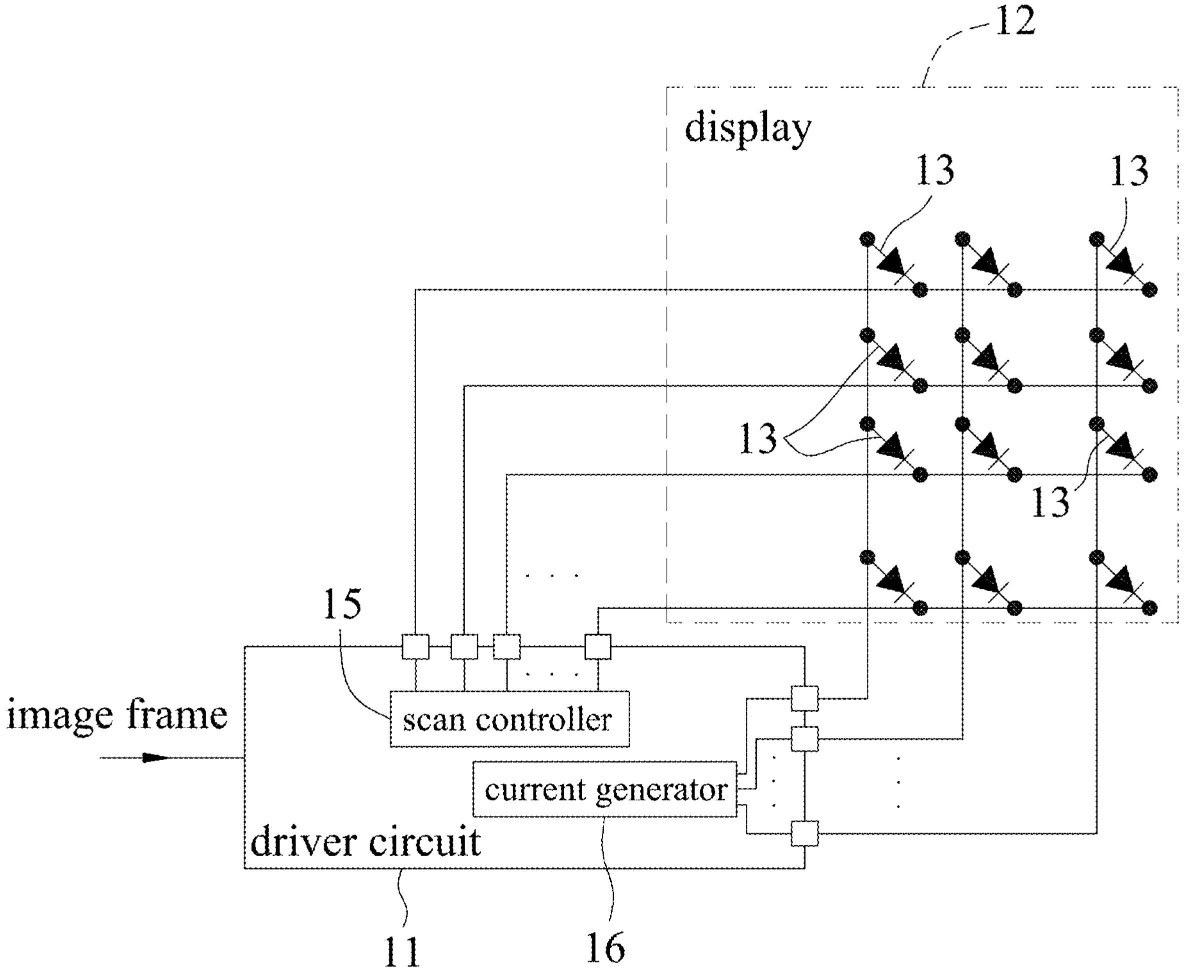
FIG. 3 is a circuit block diagram illustrating a second implementation of the embodiment that has a source type configuration.
Figure 4:
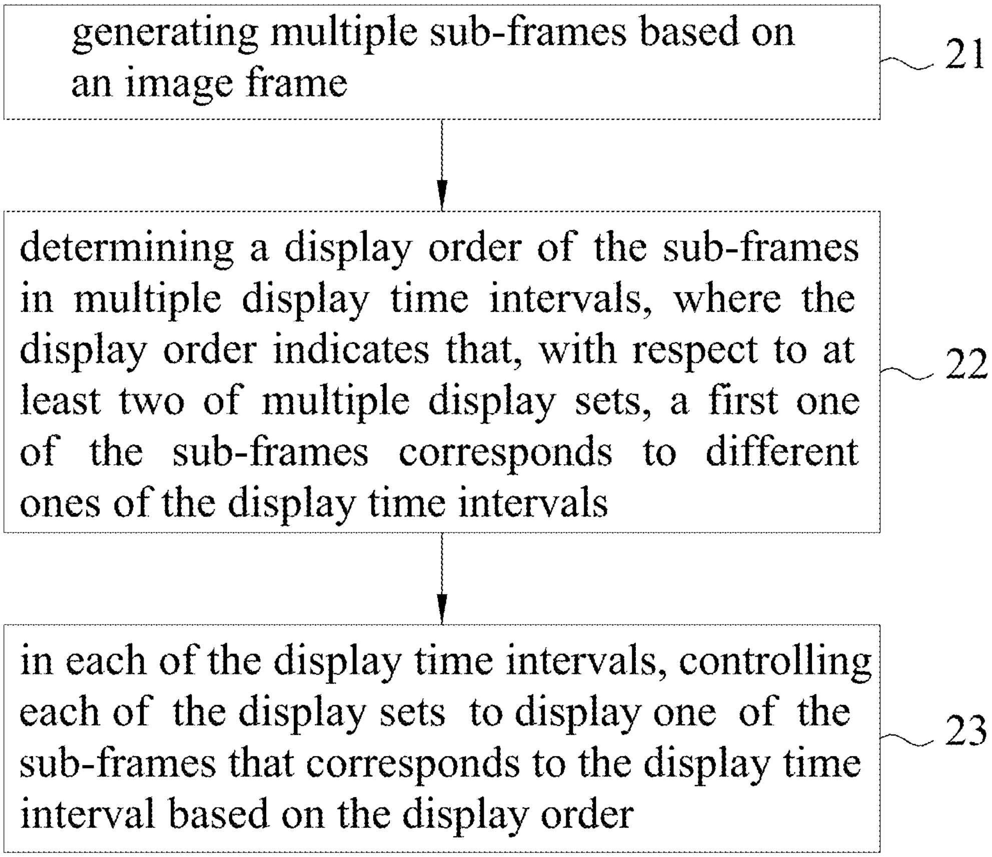
FIG. 4 is a flow chart illustrating a light emission control method performed by the embodiment.

Referring to FIGS. 2 and 3, an embodiment of a display device according to the disclosure includes a display 12 and a driver circuit 11. The display 12 includes a plurality of light emitting elements 13. The light emitting elements 13 are arranged in a matrix that has a plurality of rows and a plurality of columns. Each of the light emitting elements 13 includes a light emitting diode (LED). The diver circuit 11 includes a scan controller 15 and a current generator 16. As shown in FIG. 2, when the display device of this embodiment has a sink type configuration: with respect to each of the rows, anodes of the LEDs of the light emitting elements 13 in the row are connected to the scan controller 15 through a conductive line that corresponds to the row; and with respect to each of the columns, cathodes of the LEDs of the light emitting elements 13 in the column are connected to the current generator 16 through a conductive line that corresponds to the column. As shown in FIG. 3, when the display device of this embodiment has a source type configuration: with respect to each of the rows, the cathodes of the LEDs of the light emitting elements 13 in the row are connected to the scan controller 15 through the conductive line that corresponds to the row; and with respect to each of the columns, the anodes of the LEDs of the light emitting elements 13 in the column are connected to the current generator 16 through the conductive line that corresponds to the column.

The light emitting elements 13 are divided into a plurality of scan groups. Each of the scan groups is assigned to one of a plurality of display sets. Each of the display sets includes at least one of the scan groups. For illustration purposes, in this embodiment, the display 12 includes sixteen light emitting elements 13, and the light emitting elements 13 are arranged in a 4×4 matrix and are divided into four scan groups (SC1-SC4) (see FIG. 5).

Referring to FIGS. 2 to 5, the driver circuit 11 is configured to receive an image frame, and to perform a light emission control method that includes steps 21-23 so as to control the display 12 to show the image frame.

In step 21, the driver circuit 11 generates a number (M) of sub-frames based on the image frame. M is an integer no less than two. The image frame corresponds to a display time period, and contains frame gray values of the light emitting elements 13. The display time period includes a number (M) of display time intervals. Each of the display time intervals includes a plurality of scan time segments that respectively correspond to the scan groups (SC1-SC4). Each of the sub-frames contains partial gray values of the light emitting elements 13. With respect to each of the light emitting elements 13, the frame gray value of the light emitting element is equal to a sum of the partial gray values of the light emitting element that are respectively contained in the sub-frames, and the partial gray value of the light emitting element that is contained in an $(m-1)^{th}$ one of the sub-frames is no less than the partial gray value of the light emitting element that is contained in an $m^{th}$ one of the sub-frames, where $2 \le m \le M$. For illustration purposes, in this embodiment, eight sub-frames are generated (i.e., M=8), the display time period includes eight display time intervals (T1-T8), and each of the display time intervals (T1-T8) includes four scan time segments that respectively correspond to the scan groups (SC1-SC4).

In this embodiment, with respect to each of the light emitting elements 13, the driver circuit 11 cyclically allocates the frame gray value of the light emitting element 13 to the sub-frames from a first one to an eighth one of the sub-frames by an amount, so as to obtain the partial gray values of the light emitting element 13 that are respectively contained in the sub-frames. The amount is smaller than or equal to a predetermined value. Specifically, for each allocation of the frame gray value of the light emitting element 13 to one of the sub-frames, the amount is equal to the predetermined value if a remaining portion of the frame gray value of the light emitting element 13 before the allocation is greater than or equal to the predetermined value, and is equal to the remaining portion of the frame gray value of the light emitting element 13 before the allocation if the remaining portion of the frame gray value of the light emitting element 13 before the allocation is smaller than the predetermined value. In an example where the frame gray value of the light emitting element 13 is two and the predetermined value is one, the first one of the sub-frames receives an amount of one, and then the second one of the sub-frames receives an amount of one, so the partial gray value of the light emitting element 13 that is contained in each of the first and second ones of the sub-frames is one, and the partial gray value of the light emitting element 13 that is contained in each of the third to eighth ones of the sub-frames is zero. In another example where the frame gray value of the light emitting element 13 is one-hundred-and-forty-four and the predetermined value is sixteen, each of the first to eighth ones of the sub-frames receives an amount of sixteen during a first cycle of the allocation, and then the first one of the sub-frames receives an amount of sixteen during a second cycle of the allocation, so the partial gray value of the light emitting element 13 that is contained in the first one of the sub-frames is thirty-two, and the partial gray value of the light emitting element 13 that is contained in each of the second to eighth ones of the sub-frames is sixteen. In some other examples: $M=2^B$, where B is a positive integer; each of the frame gray values contained in the image frame is A-bits wide; and each of the partial gray values contained in the sub-frames is smaller than or equal to $2^A/2^B$.

In step 22, the driver circuit 11 determines a display order of the sub-frames in the display time intervals (T1-T8). The display order indicates, with respect to each of the display sets, a one-to-one corresponding relationship between the sub-frames and the display time intervals (T1-T8). The one-to-one corresponding relationships indicated by the display order with respect to the display sets are different from each other. In the one-to-one corresponding relationships indicated by the display order with respect to at least two of the display sets, a first one of the sub-frames corresponds to different ones of the display time intervals (T1-T8). In other words, any two of the scan groups (SC1-SC4) that are respectively assigned to two different ones of the display sets have different one-to-one corresponding relationships, and for any one of the display sets that includes at least two of the scan groups (SC1-SC4), the scan groups of the display set have the same one-to-one corresponding relationship.

Figure 5:
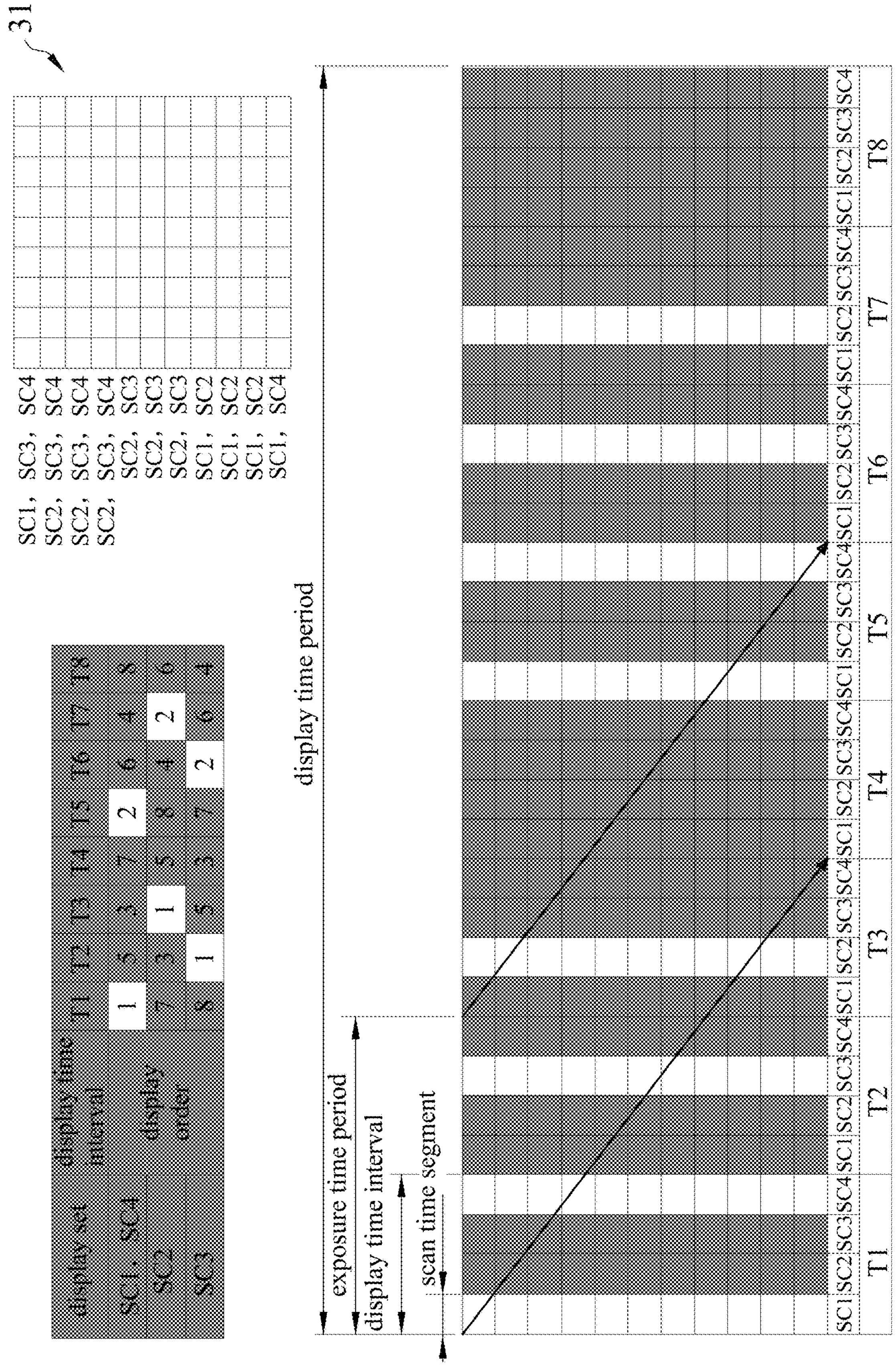
FIG. 5 is a schematic diagram illustrating a first example of a display order, a display timing and an image of the embodiment.

In a first example as shown in FIG. 5, the light emitting elements 13 are divided into three display sets. A first one of the display sets includes a first one and a fourth one of the scan groups (SC1, SC4). The one-to-one corresponding relationship indicated by the display order with respect to the first one of the display sets is that the first, fifth, third, seventh, second, sixth, fourth and eighth ones of the sub-frames respectively correspond to a first one to an eighth one of the display time intervals (T1-T8). A second one of the display sets includes a second one of the scan groups (SC2). The one-to-one corresponding relationship indicated by the display order with respect to the second one of the display sets is that the seventh, third, first, fifth, eighth, fourth, second and sixth ones of the sub-frames respectively correspond to the first to eighth ones of the display time intervals (T1-T8). A third one of the display sets includes a third one of the scan groups (SC3). The one-to-one corresponding relationship indicated by the display order with respect to the third one of the display sets is that the eighth, first, fifth, third, seventh, second, sixth and fourth ones of the sub-frames respectively correspond to the first to eighth ones of the display time intervals (T1-T8). In the one-to-one corresponding relationships indicated by the display order with respect to the first to third ones of the display sets, the first one of the sub-frames corresponds to different ones (i.e., the first, second and third ones) of the display time intervals (T1, T2, T3).

Figure 6:
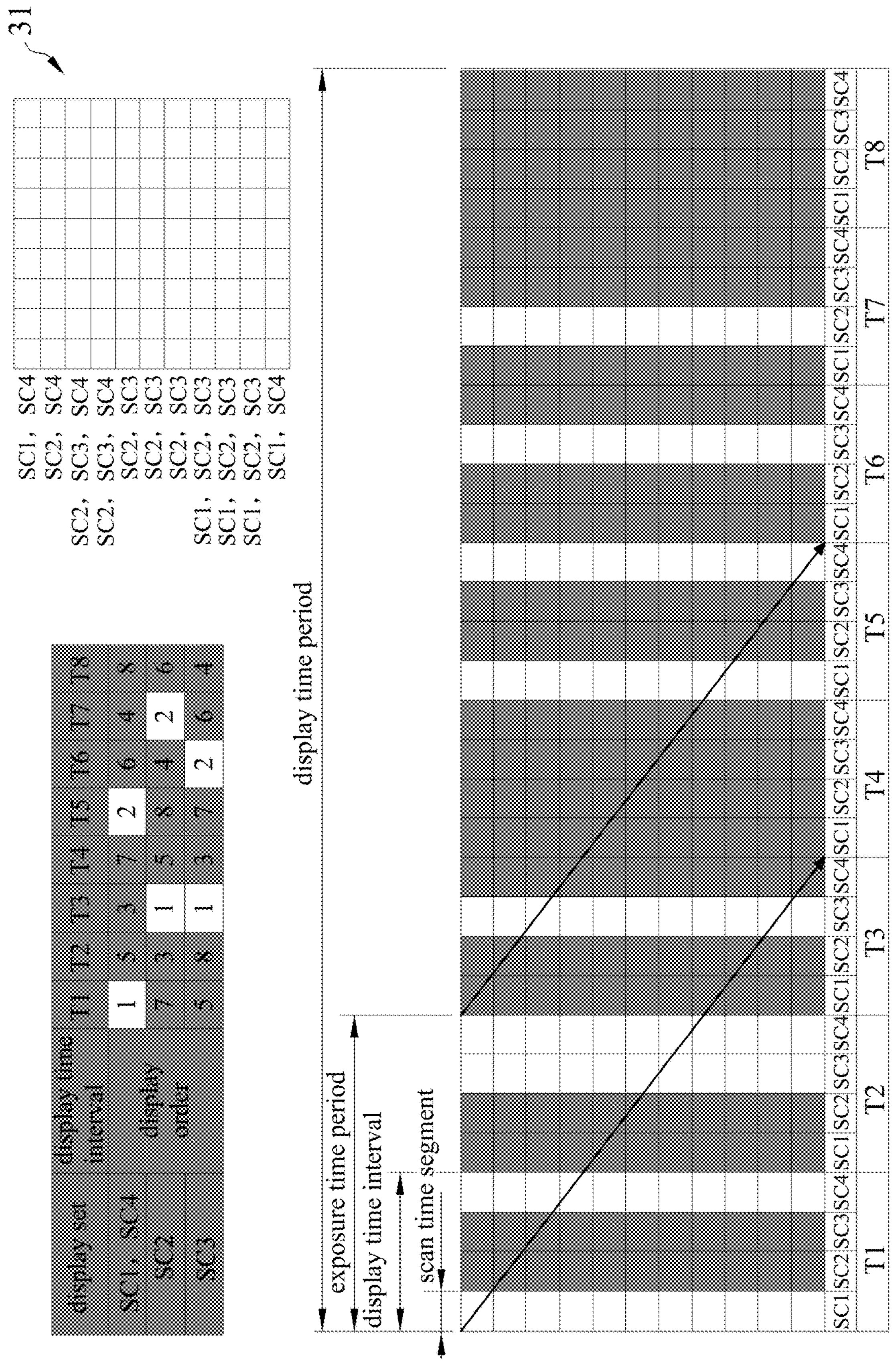
FIG. 6 is a schematic diagram illustrating a second example of the display order, the display timing and the image of the embodiment.

In a second example as shown in FIG. 6, the light emitting elements 13 are divided into three display sets. A first one of the display sets includes the first and fourth ones of the scan groups (SC1, SC4). The one-to-one corresponding relationship indicated by the display order with respect to the first one of the display sets is that the first, fifth, third, seventh, second, sixth, fourth and eighth ones of the sub-frames respectively correspond to the first to eighth ones of the display time intervals (T1-T8). A second one of the display sets includes the second one of the scan groups (SC2). The one-to-one corresponding relationship indicated by the display order with respect to the second one of the display sets is that the seventh, third, first, fifth, eighth, fourth, second and sixth ones of the sub-frames respectively correspond to the first to eighth ones of the display time intervals (T1-T8). A third one of the display sets includes the third one of the scan groups (SC3). The one-to-one corresponding relationship indicated by the display order with respect to the third one of the display sets is that the fifth, eighth, first, third, seventh, second, sixth and fourth ones of the sub-frames respectively correspond to the first to eighth ones of the display time intervals (T1-T8). In the one-to-one corresponding relationships indicated by the display order with respect to the first and second ones of the display sets or with respect to the first and third ones of the display sets, the first one of the sub-frames corresponds to different ones (i.e., the first and third ones) of the display time intervals (T1, T3).

Figure 7:
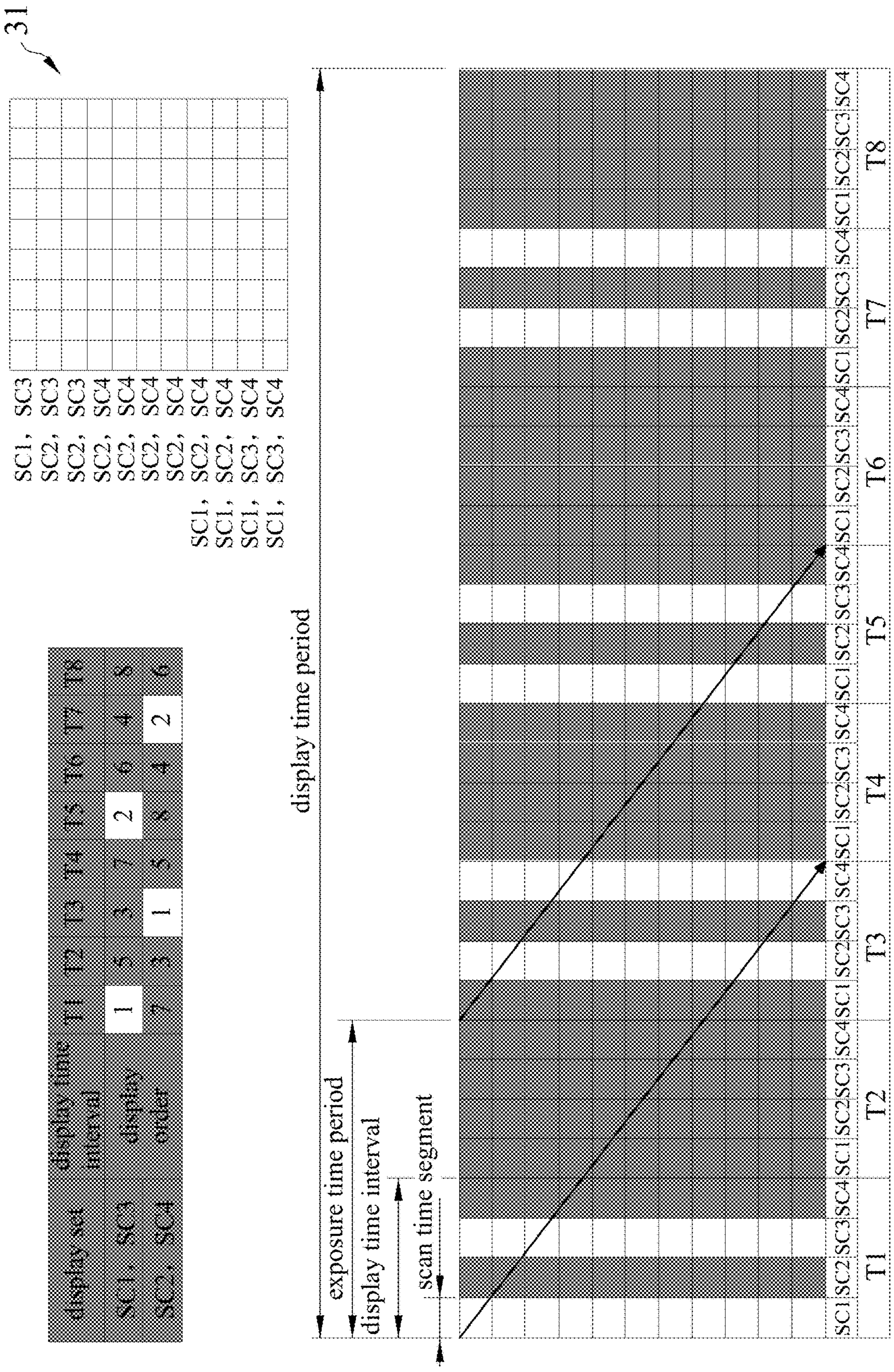
FIG. 7 is a schematic diagram illustrating a third example of the display order, the display timing and the image of the embodiment.

In a third example as shown in FIG. 7, the light emitting elements 13 are divided into two display sets. A first one of the display sets includes the first and third ones of the scan groups (SC1, SC3). The one-to-one corresponding relationship indicated by the display order with respect to the first one of the display sets is that the first, fifth, third, seventh, second, sixth, fourth and eighth ones of the sub-frames respectively correspond to the first to eighth ones of the display time intervals (T1-T8). A second one of the display sets includes the second and fourth ones of the scan groups (SC2, SC4). The one-to-one corresponding relationship indicated by the display order with respect to the second one of the display sets is that the seventh, third, first, fifth, eighth, fourth, second and sixth ones of the sub-frames respectively correspond to the first to eighth ones of the display time intervals (T1-T8). In the one-to-one corresponding relationships indicated by the display order with respect to the first and second ones of the display sets, the first one of the sub-frames corresponds to different ones (i.e., the first and third ones) of the display time intervals (T1, T3).

Figure 8:
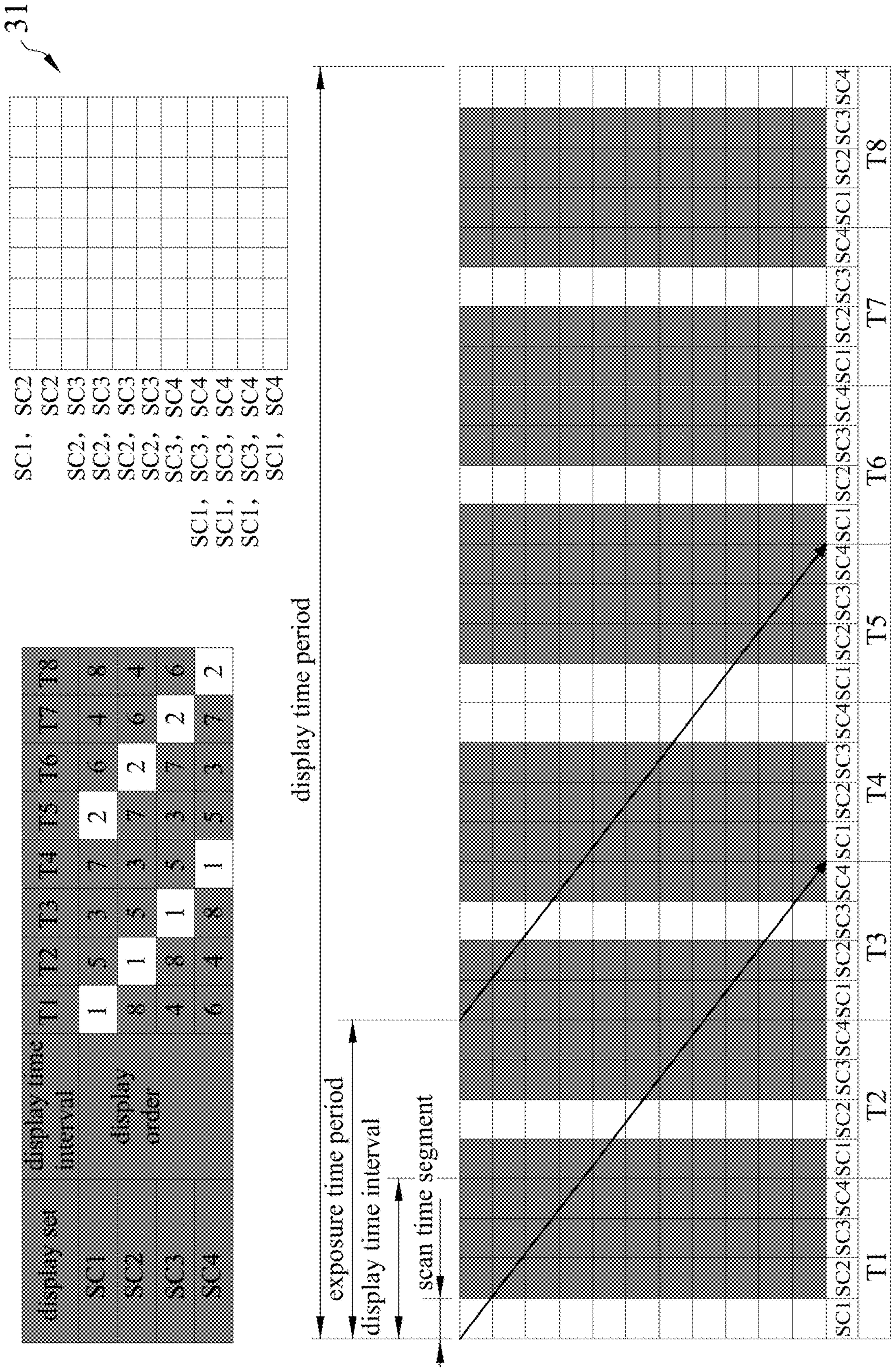
FIG. 8 is a schematic diagram illustrating a fourth example of the display order, the display timing and the image of the embodiment.

In a fourth example as shown in FIG. 8, the light emitting elements 13 are divided into four display sets. A first one of the display sets includes the first one of the scan groups (SC1). The one-to-one corresponding relationship indicated by the display order with respect to the first one of the display sets is that the first, fifth, third, seventh, second, sixth, fourth and eighth ones of the sub-frames respectively correspond to the first to eighth ones of the display time intervals (T1-T8). A second one of the display sets includes the second one of the scan groups (SC2). The one-to-one corresponding relationship indicated by the display order with respect to the second one of the display sets is that the eighth, first, fifth, third, seventh, second, sixth and fourth ones of the sub-frames respectively correspond to the first to eighth ones of the display time intervals (T1-T8). A third one of the display sets includes the third one of the scan groups (SC3). The one-to-one corresponding relationship indicated by the display order with respect to the third one of the display sets is that the fourth, eighth, first, fifth, third, seventh, second and sixth ones of the sub-frames respectively correspond to the first to eighth ones of the display time intervals (T1-T8). A fourth one of the display sets includes the fourth one of the scan groups (SC4). The one-to-one corresponding relationship indicated by the display order with respect to the fourth one of the display sets is that the sixth, fourth, eighth, first, fifth, third, seventh and second ones of the sub-frames respectively correspond to the first to eighth ones of the display time intervals (T1-T8). In the one-to-one corresponding relationships indicated by the display order with respect to the first to fourth ones of the display sets, the first one of the sub-frames corresponds to different ones (i.e., the first to fourth ones) of the display time intervals (T1-T4).

Figure 9:
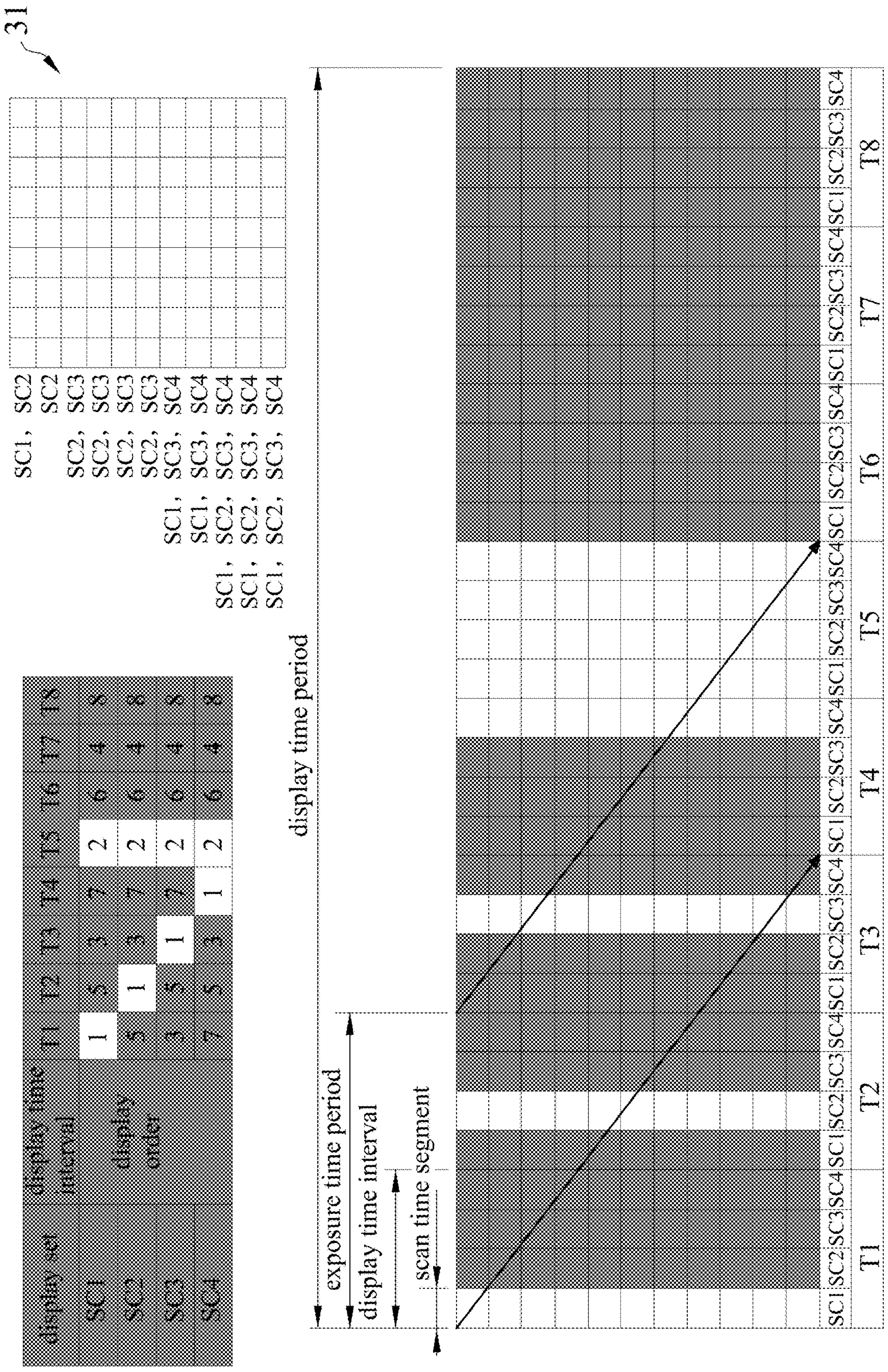
FIG. 9 is a schematic diagram illustrating a fifth example of the display order, the display timing and the image of the embodiment.

In a fifth example as shown in FIG. 9, the light emitting elements 13 are divided into four display sets. A first one of the display sets includes the first one of the scan groups (SC1). The one-to-one corresponding relationship indicated by the display order with respect to the first one of the display sets is that the first, fifth, third, seventh, second, sixth, fourth and eighth ones of the sub-frames respectively correspond to the first to eighth ones of the display time intervals (T1-T8). A second one of the display sets includes the second one of the scan groups (SC2). The one-to-one corresponding relationship indicated by the display order with respect to the second one of the display sets is that the fifth, first, third, seventh, second, sixth, fourth and eighth ones of the sub-frames respectively correspond to the first to eighth ones of the display time intervals (T1-T8). A third one of the display sets includes the third one of the scan groups (SC3). The one-to-one corresponding relationship indicated by the display order with respect to the third one of the display sets is that the third, fifth, first, seventh, second, sixth, fourth and eighth ones of the sub-frames respectively correspond to the first to eighth ones of the display time intervals (T1-T8). A fourth one of the display sets includes the fourth one of the scan groups (SC4). The one-to-one corresponding relationship indicated by the display order with respect to the fourth one of the display sets is that the seventh, fifth, third, first, second, sixth, fourth and eighth ones of the sub-frames respectively correspond to the first to eighth ones of the display time intervals (T1-T8). In the one-to-one corresponding relationships indicated by the display order with respect to the first to fourth ones of the display sets, the first one of the sub-frames corresponds to different ones (i.e., the first to fourth ones) of the display time intervals (T1-T4).

In step 23, in each of the display time intervals (T1-T8), the driver circuit 11 controls each of the display sets to display one of the sub-frames that corresponds to the display time interval (T1/ . . . /T8) according to the one-to-one corresponding relationship indicated by the display order with respect to the display set. Specifically, in each of the scan time segments of each of the display time intervals (T1-T8), one of the scan groups (SC1-SC4) that corresponds to the scan time segment is controlled to display one of the sub-frames that corresponds to the display time interval (T1/ . . . /T8) according to the one-to-one corresponding relationship indicated by the display order with respect to one of the display sets that includes the one of the scan groups (SC1-SC4).

In each of the examples as shown in FIGS. 5 to 9, the frame gray values of the light emitting elements 13 are two. The partial gray values of the light emitting elements 13 that are contained in each of the first and second ones of the sub-frames are one. The partial gray values of the light emitting elements 13 that are contained in each of the third to eighth ones of the sub-frames are zero. An image capture device (not shown) that includes, for example, eleven sensor rows is used to capture an image 31 of a screen that is constituted by the light emitting elements 13.

In the first example as shown in FIG. 5, during the first one of the display time intervals (T1), the first to fourth ones of the scan groups (SC1-SC4) respectively display the first, seventh, eighth and first ones of the sub-frames respectively in the first to fourth ones of the scan time segments, so the light emitting elements 13 of the first one of the scan groups (SC1) would emit light in the first one of the scan time segments, and the light emitting elements 13 of the fourth one of the scan groups (SC4) would emit light in the fourth one of the scan time segments. During the second one of the display time intervals (T2), the first to fourth ones of the scan groups (SC1-SC4) respectively display the fifth, third, first and fifth ones of the sub-frames respectively in the first to fourth ones of the scan time segments, so the light emitting elements 13 of the third one of the scan groups (SC3) would emit light in the third one of the scan time segments. During the third one of the display time intervals (T3), the first to fourth ones of the scan groups (SC1-SC4) respectively display the third, first, fifth and third ones of the sub-frames respectively in the first to fourth ones of the scan time segments, so the light emitting elements 13 of the second one of the scan groups (SC2) would emit light in the second one of the scan time segments. The way in which the light emitting elements 13 emit light may be inferred from the description above for each of the fourth to eighth ones of the display time intervals (T4-T8), and details thereof are omitted herein for the sake of brevity. During an exposure time period of each of the sensor rows of the image capture device, the light emitting diodes 13 of at least one of the scan groups (SC1-SC4) would emit light. For example, during the exposure time period of a first one of the sensor rows of the image capture device, the light emitting diodes 13 of the first, third and fourth ones of the scan groups (SC1, SC3, SC4) would emit light, and during the exposure time period of an eleventh one of the sensor rows of the image capture device, the light emitting diodes 13 of the first and fourth ones of the scan groups (SC1, SC4) would emit light. Therefore, no artifact would appear in the image 31 captured by the image capture device.

In the second example as shown in FIG. 6, during the first one of the display time intervals (T1), the first to fourth ones of the scan groups (SC1-SC4) respectively display the first, seventh, fifth and first ones of the sub-frames respectively in the first to fourth ones of the scan time segments, so the light emitting elements 13 of the first one of the scan groups (SC1) would emit light in the first one of the scan time segments, and the light emitting elements 13 of the fourth one of the scan groups (SC4) would emit light in the fourth one of the scan time segments. During the second one of the display time intervals (T2), the first to fourth ones of the scan groups (SC1-SC4) respectively display the fifth, third, eighth and fifth ones of the sub-frames respectively in the first to fourth ones of the scan time segments, so none of the light emitting elements 13 would emit light. During the third one of the display time intervals (T3), the first to fourth ones of the scan groups (SC1-SC4) respectively display the third, first, first and third ones of the sub-frames respectively in the first to fourth ones of the scan time segments, so the light emitting elements 13 of the second one of the scan groups (SC2) would emit light in the second one of the scan time segments, and the light emitting elements 13 of the third one of the scan groups (SC3) would emit light in the third one of the scan time segments. The way in which the light emitting elements 13 emit light may be inferred from the description above for each of the fourth to eighth ones of the display time intervals (T4-T8), and details thereof are omitted herein for the sake of brevity. During the exposure time period of each of the sensor rows of the image capture device, the light emitting diodes 13 of at least one of the scan groups (SC1-SC4) would emit light. For example, during the exposure time period of the first one of the sensor rows of the image capture device, the light emitting diodes 13 of the first and fourth ones of the scan groups (SC1, SC4) would emit light, and during the exposure time period of the eleventh one of the sensor rows of the image capture device, the light emitting diodes 13 of the first and fourth ones of the scan groups (SC1, SC4) would emit light. Therefore, no artifact would appear in the image 31 captured by the image capture device.

In the third example as shown in FIG. 7, during the first one of the display time intervals (T1), the first to fourth ones of the scan groups (SC1-SC4) respectively display the first, seventh, first and seventh ones of the sub-frames respectively in the first to fourth ones of the scan time segments, so the light emitting elements 13 of the first one of the scan groups (SC1) would emit light in the first one of the scan time segments, and the light emitting elements 13 of the third one of the scan groups (SC3) would emit light in the third one of the scan time segments. During the second one of the display time intervals (T2), the first to fourth ones of the scan groups (SC1-SC4) respectively display the fifth, third, fifth and third ones of the sub-frames respectively in the first to fourth ones of the scan time segments, so none of the light emitting elements 13 would emit light. During the third one of the display time intervals (T3), the first to fourth ones of the scan groups (SC1-SC4) respectively display the third, first, third and first ones of the sub-frames respectively in the first to fourth ones of the scan time segments, so the light emitting elements 13 of the second one of the scan groups (SC2) would emit light in the second one of the scan time segments, and the light emitting elements 13 of the fourth one of the scan groups (SC4) would emit light in the fourth one of the scan time segments. The way in which the light emitting elements 13 emit light may be inferred from the description above for each of the fourth to eighth ones of the display time intervals (T4-T8), and details thereof are omitted herein for the sake of brevity. During the exposure time period of each of the sensor rows of the image capture device, the light emitting diodes 13 of at least one of the scan groups (SC1-SC4) would emit light. For example, during the exposure time period of the first one of the sensor rows of the image capture device, the light emitting diodes 13 of the first and third ones of the scan groups (SC1, SC3) would emit light, and during the exposure time period of the eleventh one of the sensor rows of the image capture device, the light emitting diodes 13 of the first, third and fourth ones of the scan groups (SC1, SC3, SC4) would emit light. Therefore, no artifact would appear in the image 31 captured by the image capture device.

In the fourth example as shown in FIG. 8, during the first one of the display time intervals (T1), the first to fourth ones of the scan groups (SC1-SC4) respectively display the first, eighth, fourth and sixth ones of the sub-frames respectively in the first to fourth ones of the scan time segments, so the light emitting elements 13 of the first one of the scan groups (SC1) would emit light in the first one of the scan time segments. During the second one of the display time intervals (T2), the first to fourth ones of the scan groups (SC1-SC4) respectively display the fifth, first, eighth and fourth ones of the sub-frames respectively in the first to fourth ones of the scan time segments, so the light emitting elements 13 of the second one of the scan groups (SC2) would emit light in the second one of the scan time segments. During the third one of the display time intervals (T3), the first to fourth ones of the scan groups (SC1-SC4) respectively display the third, fifth, first and eighth ones of the sub-frames respectively in the first to fourth ones of the scan time segments, so the light emitting elements 13 of the third one of the scan groups (SC3) would emit light in the third one of the scan time segments. The way in which the light emitting elements 13 emit light can be inferred from the description above for each of the fourth to eighth ones of the display time intervals (T4-T8), and details thereof are omitted herein for the sake of brevity. During the exposure time period of each of the sensor rows of the image capture device, the light emitting diodes 13 of at least one of the scan groups (SC1-SC4) would emit light. For example, during the exposure time period of the first one of the sensor rows of the image capture device, the light emitting diodes 13 of the first and second ones of the scan groups (SC1, SC2) would emit light, and during the exposure time period of the eleventh one of the sensor rows of the image capture device, the light emitting diodes 13 of the first and fourth ones of the scan groups (SC1, SC4) would emit light. Therefore, no artifact would appear in the image 31 captured by the image capture device.

In the fifth example as shown in FIG. 9, during the first one of the display time intervals (T1), the first to fourth ones of the scan groups (SC1-SC4) respectively display the first, fifth, third and seventh ones of the sub-frames respectively in the first to fourth ones of the scan time segments, so the light emitting elements 13 of the first one of the scan groups (SC1) would emit light in the first one of the scan time segments. During the second one of the display time intervals (T2), the first to fourth ones of the scan groups (SC1-SC4) respectively display the fifth, first, fifth and fifth ones of the sub-frames respectively in the first to fourth ones of the scan time segments, so the light emitting elements 13 of the second one of the scan groups (SC2) would emit light in the second one of the scan time segments. During the third one of the display time intervals (T3), the first to fourth ones of the scan groups (SC1-SC4) respectively display the third, third, first and third ones of the sub-frames respectively in the first to fourth ones of the scan time segments, so the light emitting elements 13 of the third one of the scan groups (SC3) would emit light in the third one of the scan time segments. The way in which the light emitting elements 13 emit light may be inferred from the description above for each of the fourth to eighth ones of the display time intervals (T4-T8), and details thereof are omitted herein for the sake of brevity. During the exposure time period of each of the sensor rows of the image capture device, the light emitting diodes 13 of at least one of the scan groups (SC1-SC4) would emit light. For example, during the exposure time period of the first one of the sensor rows of the image capture device, the light emitting diodes 13 of the first and second ones of the scan groups (SC1, SC2) would emit light, and during the exposure time period of the eleventh one of the sensor rows of the image capture device, the light emitting diodes 13 of the first to fourth ones of the scan groups (SC1-SC4) would emit light. Therefore, no artifact would appear in the image 31 captured by the image capture device.

In view of the above, since the first one of the sub-frames corresponds to different ones of the display time intervals (T1-T8) in the one-to-one corresponding relationships with respect to at least two of the display sets, artifacts can be reduced, and therefore flickering can be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light emission control method to be implemented by a driver circuit and for controlling a display, the display including a plurality of light emitting elements that are divided into a plurality of display sets, said light emission control method comprising steps of:

(A) generating a number (M) of sub-frames based on an image frame, where

M is an integer no less than two, the image frame corresponds to a display time period, and contains frame gray values of the plurality of light emitting elements, the display time period includes a number (M) of display time intervals, each of the number (M) of sub-frames contains partial gray values of the plurality of light emitting elements, and with respect to each of the plurality of light emitting elements, the frame gray value of the light emitting element is equal to a sum of the partial gray values of the light emitting element that are respectively contained in the number (M) of sub-frames, and the partial gray value of the light emitting element that is contained in an $(m-1)^{th}$ one of the number (M) of sub-frames is no less than the partial gray value of the light emitting element that is contained in an $m^{th}$ one of the number (M) of sub-frames, in which $2 \le m \le M$;

(B) determining a display order of the number (M) of sub-frames in the number (M) of display time intervals, where the display order indicates, with respect to each of the plurality of display sets, a one-to-one corresponding relationship between the number (M) of sub-frames and the number (M) of display time intervals, the one-to-one corresponding relationships indicated by the display order with respect to the plurality of display sets are different from each other, and in the one-to-one corresponding relationships indicated by the display order with respect to at least two of the plurality of display sets, a first one of the number (M) of sub-frames corresponds to different ones of the number (M) of display time intervals; and (C) in each of the number (M) of display time intervals, controlling each of the plurality of display sets to display one of the number (M) of sub-frames that corresponds to the display time interval according to the one-to-one corresponding relationship indicated by the display order with respect to the display set.

2. The light emission control method as claimed in claim 1, wherein, in step (A):

with respect to each of the plurality of light emitting elements, the frame gray value of the light emitting element is cyclically allocated to the sub-frames from a first one to an $M^{th}$ one of the number (M) of sub-frames by an amount, so as to obtain the partial gray values of the light emitting element that are respectively contained in the number (M) of sub-frames, where the amount is smaller than or equal to a predetermined value.

3. The light emission control method as claimed in claim 2, wherein, in step (A):

with respect to each of the plurality of light emitting elements, for each allocation of the frame gray value of the light emitting element to one of the number (M) of sub-frames, the amount is equal to the predetermined value if a remaining portion of the frame gray value of the light emitting element before the allocation is greater than or equal to the predetermined value, and is equal to the remaining portion of the frame gray value of the light emitting element before the allocation if the remaining portion of the frame gray value of the light emitting element before the allocation is smaller than the predetermined value.

4. The light emission control method as claimed in claim 1, wherein:

$M=2^B$, where B is a positive integer;

each of the frame gray values contained in the image frame is A-bits wide; and each of the partial gray values contained in the number (M) of sub-frames is smaller than or equal to $2^A/2^B$.

5. The light emission control method as claimed in claim 1, wherein, in step (B):

in the one-to-one corresponding relationships indicated by the display order with respect to the plurality of display sets, the first one of the number (M) of sub-frames corresponds to different ones of the number (M) of display time intervals.

6. The light emission control method as claimed in claim 1, the plurality of light emitting elements being divided into a plurality of scan groups, each of the plurality of scan groups being assigned to one of the plurality of display sets, each of the plurality of display sets including at least one of the plurality of scan groups, wherein:

each of the number (M) of display time intervals includes a plurality of scan time segments that respectively correspond to the plurality of scan groups; and in step (C), in each of the plurality of scan time segments of each of the number (M) of display time intervals, one of the plurality of scan groups that corresponds to the scan time segment is controlled to display one of the number (M) of sub-frames that corresponds to the display time interval according to the one-to-one corresponding relationship indicated by the display order with respect to one of the plurality of display sets that includes said one of the plurality of scan groups.

7. A display device comprising:

a display including a plurality of light emitting elements that are divided into a plurality of display sets; and a driver circuit connected to said display, and configured to receive an image frame, where the image frame corresponds to a display time period, and contains frame gray values of said plurality of light emitting elements, and the display time period includes a number (M) of display time intervals, in which M is an integer no less than two, generate a number (M) of sub-frames based on the image frame, where each of the number (M) of sub-frames contains partial gray values of said plurality of light emitting elements, and with respect to each of said plurality of light emitting elements, the frame gray value of said light emitting element is equal to a sum of the partial gray values of said light emitting element that are respectively contained in the number (M) of sub-frames, and the partial gray value of said light emitting element that is contained in an $(m-1)^{th}$ one of the number (M) of sub-frames is no less than the partial gray value of said light emitting element that is contained in an $m^{th}$ one of the number (M) of sub-frames, in which 2≤m≤M, and in each of the number (M) of display time intervals, control each of said plurality of display sets to display one of the number (M) of sub-frames that corresponds to the display time interval, where with respect to each of said plurality of display sets, the number (M) of sub-frames corresponds to the number (M) of display time intervals in a one-to-one corresponding relationship, the one-to-one corresponding relationships with respect to said plurality of display sets are different from each other, and in the one-to-one corresponding relationships with respect to at least two of said plurality of display sets, a first one of the number (M) of sub-frames corresponds to different ones of the number (M) of display time intervals.

8. The display device as claimed in claim 7, wherein:

with respect to each of said plurality of light emitting elements, said driver circuit cyclically allocates the frame gray value of said light emitting element to the sub-frames from a first one to an $M^{th}$ one of the number (M) of sub-frames by an amount, so as to obtain the partial gray values of said light emitting element that are respectively contained in the number (M) of sub-frames, where the amount is smaller than or equal to a predetermined value.

9. The display device as claimed in claim 8, wherein:

with respect to each of said plurality of light emitting elements, for each allocation of the frame gray value of said light emitting element to one of the number (M) of sub-frames, the amount is equal to the predetermined value if a remaining portion of the frame gray value of said light emitting element before the allocation is greater than or equal to the predetermined value.

10. The display device as claimed in claim 9, wherein:

with respect to each of said plurality of light emitting elements, for each allocation of the frame gray value of said light emitting element to one of the number (M) of sub-frames, the amount is equal to the remaining portion of the frame gray value of said light emitting element before the allocation if the remaining portion of the frame gray value of said light emitting element before the allocation is smaller than the predetermined value.

11. The display device as claimed in claim 7, wherein:

$M=2^B$, where B is a positive integer;

each of the frame gray values contained in the image frame is A-bits wide; and each of the partial gray values contained in the number (M) of sub-frames is smaller than or equal to $2^A/2^B$.

12. The display device as claimed in claim 7, wherein:

in the one-to-one corresponding relationships with respect to said plurality of display sets, the first one of the number (M) of sub-frames corresponds to different ones of the number (M) of display time intervals.

13. The display device as claimed in claim 7, wherein:

said plurality of light emitting elements are divided into a plurality of scan groups;

each of said plurality of scan groups is assigned to one of said plurality of display sets;

each of said plurality of display sets includes at least one of said plurality of scan groups;

each of the number (M) of display time intervals includes a plurality of scan time segments that respectively correspond to said plurality of scan groups; and in each of the plurality of scan time segments of each of the number (M) of display time intervals, said driver circuit controls one of said plurality of scan groups that corresponds to the scan time segment to display one of the number (M) of sub-frames that corresponds to the display time interval according to the one-to-one corresponding relationship with respect to one of said plurality of display sets that includes said one of said plurality of scan groups.

* * * * *